United States Patent [19]

Kalfhaus

[11] 4,344,125
[45] Aug. 10, 1982

[54] SYSTEM FOR PRECISE REGULATION OF THE OUTPUT VOLTAGE OR CURRENT OF A PUSH-PULL INVERTER HAVING LARGE VARIATIONS OF INPUT VOLTAGE

[76] Inventor: Reinhard Kalfhaus, Mainring 10, D-6451 Mainhausen, Fed. Rep. of Germany

[21] Appl. No.: 263,553

[22] Filed: May 14, 1981

[51] Int. Cl.³ ............................................. H02P 13/00
[52] U.S. Cl. .......................................... 363/80; 363/97
[58] Field of Search ........................ 363/25, 26, 80, 97

[56] References Cited

U.S. PATENT DOCUMENTS

| | | | |
|---|---|---|---|
| 3,657,631 | 4/1972 | Martens et al. | 363/26 |
| 3,873,903 | 3/1975 | Koetsch et al. | 363/25 |
| 4,150,424 | 4/1979 | Nuechterlein | 363/26 |
| 4,162,524 | 7/1979 | Jansson | 363/25 X |

*Primary Examiner*—William M. Shoop
*Attorney, Agent, or Firm*—Dennison, Meserole, Pollack & Scheiner

[57] ABSTRACT

A system is disclosed for maintaining the precise regulation of the output voltage or current of a push-pull inverter subject to large variations of input voltage as well as output voltage or current, without variable fluctuations which would produce asymmetrical direct currents in the primary of the push-pull inverter transformer. A regulation fluctuation signal is produced from the output voltage or current by comparing the actual nominal value with a desired standard value. The actual value is made constant by varying the switching times of periodically switched transistors, which alternately switch current in the two primary windings of the push-pull inverter transformer. The integrals of the voltage or current wave forms in each conduction period of the transistors are derived from the transistor signal amplitudes during two consecutive periods. Differential signals are formed from the two transistor signal amplitudes, which are superimposed on the regulation fluctuation to thereby decrease the undesired fluctuations.

18 Claims, 2 Drawing Figures

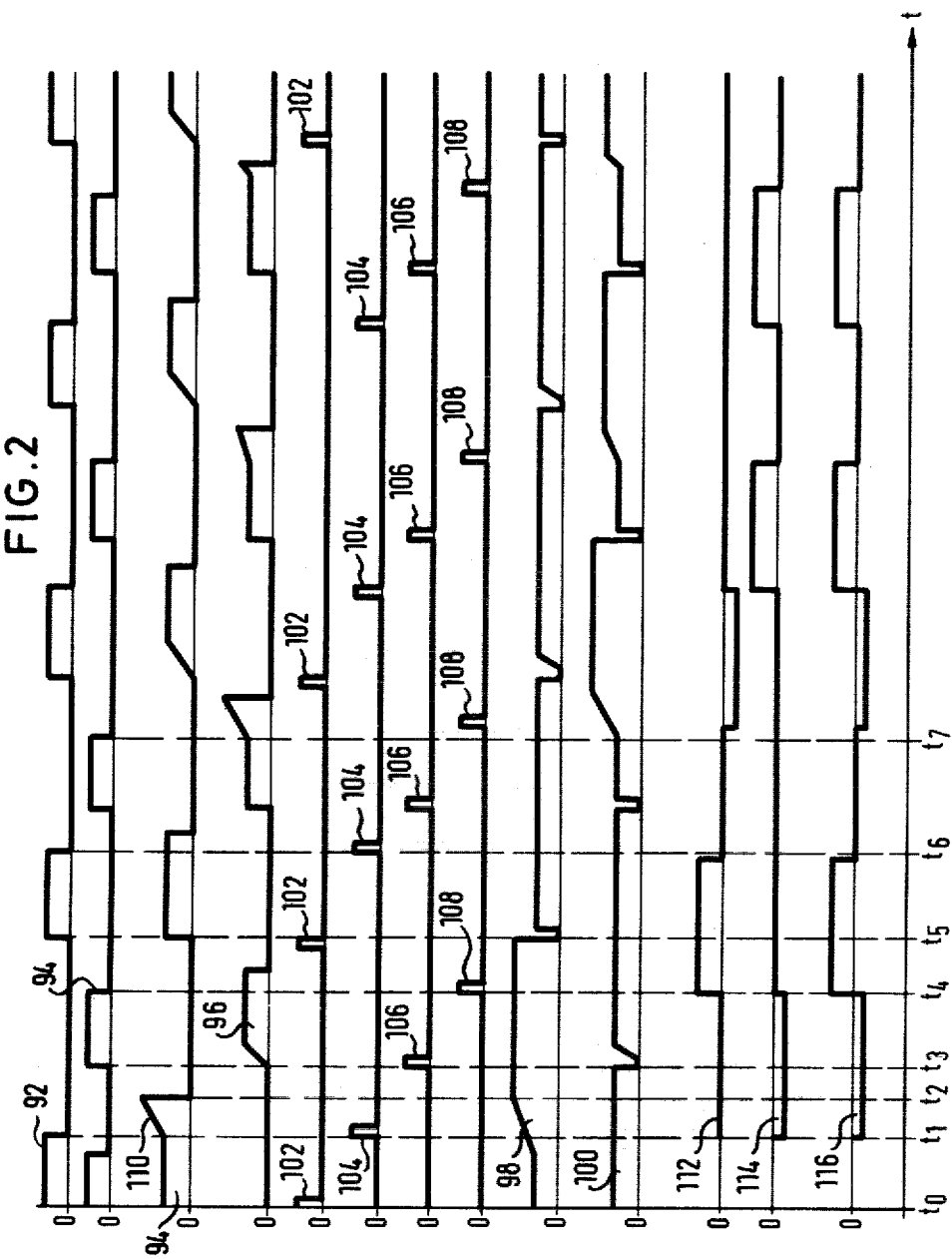

SYSTEM FOR PRECISE REGULATION OF THE OUTPUT VOLTAGE OR CURRENT OF A PUSH-PULL INVERTER HAVING LARGE VARIATIONS OF INPUT VOLTAGE

BACKGROUND OF THE INVENTION

The invention relates to a process and an apparatus for maintaining precise regulation of the output voltage or current of a push-pull inverter with large fluctuations of input voltage, whereby the regulation fluctuation formed from the output voltage or current has an actual nominal value with respect to a desired standard value, which regulation fluctuation is decreased by varying the switching times of alternately periodically switched transistors connected to the two primary windings of the push-pull inverter transformer.

Single-ended or push-pull choppers, also called inverters, are known for converting direct voltages of a predetermined value into direct voltages of another value. These choppers use transformers having primary windings, and generally have transistor switches in series with the respective windings for interrupting current flow through the primary. Push-pull choppers, as opposed to single-ended choppers, have various advantages, for example, the production of a symmetrical secondary voltage in the transformer, a small reverse blocking voltage on the disconnected transistors, a small and uniform current flow in the transistors, and a high degree of efficiency.

The value of the output voltage or current of the inverter can be influenced by varying the duration of current flow on the primary side of the transformer. This property can further be used for regulating the output voltage or current. The actual nominal value of the output voltage or current may be compared with an adjustable standard value. The regulation deviation obtained by the comparison is used to control a pulse width modulator, which produces conduction control signals for the transistors. Satisfactory regulation in a push-pull chopper depends on the symmetry of the current and voltages in the two circuits in which the transistors and primary windings or primary winding halves are each connected in series. Symmetry may be broken down by variations of the input voltage of the push-pull inverter output stage. An asymmetrical voltage or current arising over a certain period in one of the circuits generates an average direct current through the primary winding or winding halves, which brings about a progressive saturation of the transformer. With a saturated transformer, only a very small impedance is in series with the transistor, and the transistor is thereby overloaded by high currents.

SUMMARY OF THE INVENTION

The process and apparatus of the present invention advantageously maintains precise regulation of the output voltage or current of a push-pull inverter, whereby disturbance variables do not lead to asymmetrical direct currents in the primary of the push-pull inverter transformer.

This object is attained, according to the invention, by producing the integrals, or voltage-time areas, of the voltages arising in the alternate transistor current-carrying periods, or by simply determining the amplitudes of the currents flowing through the transistors, to produce differential signals in two sequential transistor conduction periods, which are then superimposed on the regulation fluctuation (as disturbance variables or control feedback variables) to reduce undesired fluctuation. It is possible with the present system to obtain precise regulation of output current or voltage even with variations of input voltage in a ratio of more than 5 to 1. Further, the development of unduly high asymmetrical current in the switching transistors is avoided. Therefore, the regulation system may be utilized with all of the aforementioned advantages of a push-pull inverter.

In a preferred embodiment, two differential signals are produced in the alternate conduction periods of the transducers which differential signals are alternately shunted off. The integrals of the alternating conduction period voltages, or current amplitudes, are alternately used as interchanged minuend and subtrahend to form the two differential signals. The differential thus formed is used to reduce the variable fluctuation of the output voltage or current. When the first differential signal is used as the control feedback variable, the conduction time of the second transistor will be increased if the voltage integral or current amplitude of the first transistor exceeds that of the second transistor; or the conduction time of the second transistor will be shortened if the voltage integral or current amplitude of the first transistor falls below that of the second transistor. When the second differential signal is used as the superimposed control feedback variable, the conduction time of the first transistor will be lengthened if the voltage integral or current amplitude of the second transistor exceeds that of the first transistor; or, the conduction time of the first transistor will be shortened, if the voltage integral or current amplitude of the second transistor falls below that of the first transistor.

In this process, the time constant of the voltage or current regulation circuit will only be varied slightly. By virtue of the nearly uniform regulation time constant, deviations of the nominal value from the desired standard value, arising from charging fluctuations, are avoided. This advantage is obtained by the timed integration of the shunted out asymmetrical signals in both primary circuits. A particular advantage is that a half period is sufficient for detection and regulation. The detection of hours occurs following the conduction phase of the transistor.

A circuit arrangement for this regulation process is used with a push-pull inverter having a transformer with two identical primary windings or one primary winding provided with a center tap. The primary windings or the primary winding halves arranged on either side of the center tap are in series with the switching transistors and voltage time area measuring devices (or integrators) or, alternatively, current inverters having apparent ohmic resistances. The respective inverter output signals are coupled to peak detectors including capacitors which are shunted to zero at the beginning of the conduction signal for the corresponding transistor. The peak detector outputs are coupled to a subtraction circuit which produces two differential signals, in which the minuend and subtrahend are interchanged. The two differential signals are coupled to respective capacitors which are alternately shunted to zero by the conduction signals. The capacitors are further coupled to inputs of a differential amplifier to produce control feedback variables which are superimposed upon the regulation fluctuation. A summing circuit effects the superimposition, and further feeds a pulse width modulator having two outputs for alternate switching of the transistors. In a further arrangement, switches are connected parallel to the capacitors and are driven by output signals by monostable flip-flop stages, which are activated by the leading edge of a control signal for the conduction of the transistors.

In these arrangements, a simply structured regulation circuit produces satisfactory operation of the push-pull inverter even with large input voltage fluctuations and charging fluctuations. Further features and advantages of the invention will be understood from the following detailed description of the invention, with reference to the drawings.

BRIEF DESCRIPTION OF THE DRAWINGS

FIG. 2 shows the wave forms of voltages developed at various points in the circuit arrangement of FIG. 1.

DESCRIPTION OF THE PREFERRED EMBODIMENTS

Figure 1:
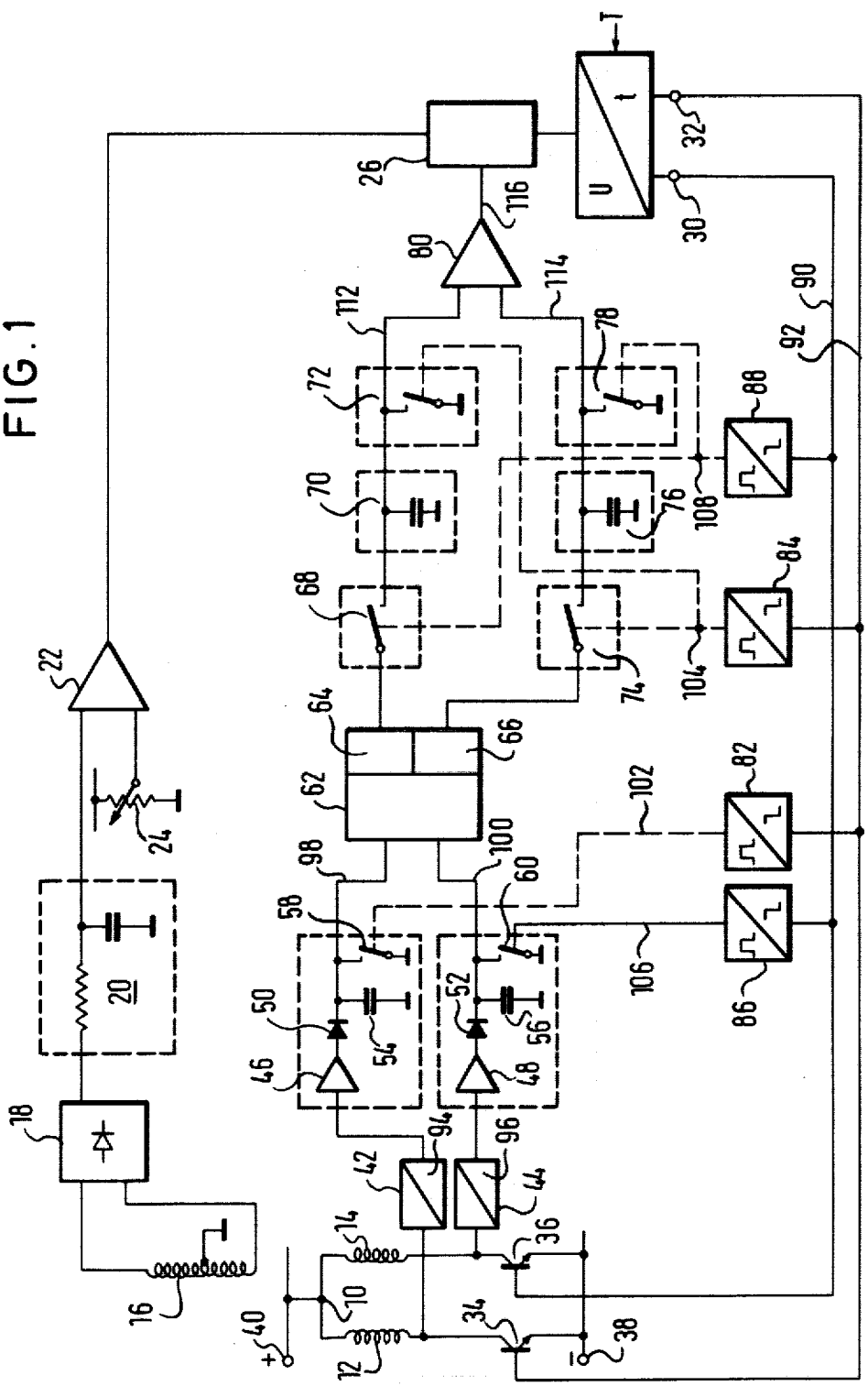
FIG. 1 is a block diagram of a circuit for maintaining precise regulation of the output voltage or current of a push-pull converter having fluctuations of input and output voltage.

The push-pull voltage inverter shown in FIG. 1 includes a transformer with two primary winding halves 12 and 14 connected to each other through a center tap 10, and with a secondary winding 16 having a center tap applied to ground potential. The ends of the secondary winding 16 are connected to a full wave rectifier 18. The full wave rectifier output is coupled to filter 20 which forms a voltage time area integral. The filter may include a capacitor and an inductive reactance, which are not shown in more detail. Current users, not shown, can be connected to the output of filter 20.

The output of filter 20 stabilizes the direct current pulsing from rectifier 18 and is further connected to an input of differential amplifier 22. The second input of differential amplifier 22 is connected to an adjustable direct current source 24. The output voltage of filter 20 sets the actual value of the nominal value, while the voltage tapped from direct voltage source 24 by a potentiometer forms the desired standard value. The regulation fluctuation is determined by the difference between the desired standard value and the actual value, and this regulation fluctuation signal is coupled to an input of summing circuit 26.

A pulse width modulator 28 is connected to the output of summing circuit 26, and has two outputs 30 and 32 for coupling two pulse width modulated signals which are 180 degrees out of phase with each other to the basis of transistors 34 and 36. Transistor 34 is connected in series with transformer primary winding half 12. Similarly, transistor 36 is arranged in series with primary winding half 14. The emitters of transistors 34 and 36 are connected together and to the negative side 38 of a direct current source, the positive side of which is coupled to center tap 10.

An integrator for measuring the time integral of the voltage during one period of the pulse width modulated signal can be connected to each connection point between primary winding half 12 and the collector of transistor 34, and between primary winding half 14 and the collector of transistor 36. Alternatively, instead of using voltage time area measuring devices, current inverters can be used for the currents flowing through transistors 34 and 36. In the circuit arrangement shown in FIG. 1, current inverters 42 and 44 are shown schematically in the primary circuit of the transformer. The primary windings of the current inverters, not shown in more detail, may be in series with respective primary winding halves 12 and 14. Apparent ohmic resistances are in parallel with the secondary windings (not shown) of the current inverters 42 and 44, in which voltages are induced which are proportional to the currents flowing through transistors 34 and 36.

The respective apparent ohmic resistances are coupled by amplifiers 46 and 48, and rectifiers 50 and 52, to analog capacitors 54 and 56. The combination of amplifier 46 or 48, diodes 50, 52 and capacitors 54, 56 forms a peak value detector. Analog capacitors 54 and 56 can be coupled to ground potential. Switches 58 and 60, which can be switching transistors, are connected parallel to analog capacitors 54 and 56.

Analog capacitors 54 and 56 are each connected to one input of subtraction circuit 62, which produces two differential signals. The first differential signal, which is available at output 64, has a value formed by taking the voltage on analog capacitor 54 as the minuend and the voltage on analog capacitor 56 as the subtrahend. The second differential signal at output signal 66 is the reverse; i.e., the minuend is the voltage on analog capacitor 56, while the subtrahend is the voltage on analog capacitor 54. Switch 68 is connected between output 64 and analog capacitor 70. Parallel to capacitor 70 is another switch 72.

Output 66 feeds a circuit having the same elements as the circuit connected at output 64. Switch 74 is coupled to output 66, and is further connected to analog capacitor 76 and parallel switch 78. The switches 68, 72, 74 and 78 can be switching transistors. Analog elements 70 and 76 are capacitors.

Analog capacitors 70 and 76 are coupled to respective inputs of amplifier 80, the output of which is connected to the second input of summing circuit 26. Monostable flip-flops 82 and 84 are connected to output 32 of pulse width modulator 28. Flip-flop 82 is excited by the beginning of the leading edge of the pulse width modulated signal produced at output 32, while flip-flop 84 is switched by the termination of the then trailing edge of the same pulse width modulated signal. Output 30 feeds monostable flip-flops 86 and 88. While the leading edge of the pulse width modulated signal at output 30 limits flip-flops 86, the trailing edge of this signal brings flip-flop 88 into correspondence.

Switch 58 is controlled by the output signal from flip-flop 82. With the appearance of the short duration output signal produced by the flip-flop, switch 58 is closed. The duration of the signal is such that analog capacitor 54 is discharged. The short duration output signal of flip-flop 84 is adapted to the discharging or charging time of analog capacitors 76 and 70. The output of flip-flop 86 controls switch 60, through which analog capacitor 56 is discharged during the duration of the output signal. Switches 68 and 78 are coupled to the output of flip-flop 88, which is adapted to the discharging or charging time of analog capacitors 76 and 70.

The voltages appearing at outputs 30 or 32 are shown in the diagram of FIG. 2, indicated by 90 and 92. (Of course the signals appearing at outputs 30 and 32 can also originate from an outside pulse generator T.) Both voltages consist of rectangular signals with a predetermined period. Voltages 90 and 92 are 180° out of phase with each other.

During the duration of both rectangular voltages 90 and 92, transistors 34 and 36 receive base currents which control their saturation. Currents then flow through primary winding halves 12 and 14, and transistors 34 and 36. Proportional voltages 94 and 96 arise across the apparent ohmic resistances of current inverters 42 and 44, through transistors 34 and 36. These voltages are fed to analog capacitors 54 and 56 through amplifiers 46 and 48, which receive the peak values of voltages 98 and 100. Flip-flop 82 produces pulse 102, by which switch 58 is closed. Flip-flop 86 produces pulse 106. From flip-flop 84 are produced pulses 104, which operate switches 72 and 74. Finally, flip-flop 88 supplies pulse 108 for controlling switches 68 and 78.

A pulse 102 appears, for example, at time $t_0$. As a result, analog capacitor 54 is discharged and voltage 98 is set back to zero. After termination of pulse 102, the voltage 98 jumps to the value of voltage 94. It is assumed that prior to time $t_1$ the transformer reached saturation as a result of additional input voltage. The saturation generates a low impedance in circuit with primary winding half 12. Therefore the current increases in the winding and in transistor 34. The leading edge of the voltage, which is proportional to the current through the apparent ohmic resistance of current inverter 52, is shown as 110 in FIG. 2. Since the current in primary winding half 14 is zero at time $t_1$, the output of the apparent ohmic resistance of inverter 44 is also at zero. The voltage on analog capacitor 54 follows the rise of voltage 94 until the peak value is reached. In analog capacitor 56, another value is to be obtained, which was given at a time point before the time $t_0$ shown in FIG. 2. This value corresponds to the current flowing through transistor 36 without saturation of the transformer. The differential between voltages 98 and 100 gives signal 112 in FIG. 2, which has the value zero, as long as the values contained in analog capacitors 54 and 56 correspond to the symmetrical currents flowing without saturation of the transformer. In that case, the differential between voltage 98 as minuend and voltage 100 as subtrahend is zero. This differential is shown by 144 in FIG. 2.

At time $t_1$, voltage 94 is already slightly greater than that voltage which corresponds to the nominal value of the current through the unsaturated transformer. This insignificant increase is also present in the development of voltage 98. Since pulse 104 appears at time point $t_1$, analog capacitor 70 is set back to zero and the differential voltage at output element 55 is given by analog capacitor 76. By setting back capacitor 70, voltage 112 remains at zero at time $t_1$. Voltage 114 on the other hand is more negative when voltage 98 is increased with respect to the normal value. The same jump to a negative value creates the voltage at the output of amplifier 80. This voltage is shown by 116 in FIG. 2.

At time $t_2$, current flow through transistor 34 stops. The maximum value of voltage 98 at time $t_2$ is then still stored. The remaining voltages retain those values of time $t_1$.

At time $t_3$, the base of transistor 35 receives current and transistor 36 conducts. Presaturation of the transformer is commenced by the asymmetrical flow of current in transistor 34, so that the current in transistor 36, and therewith the voltage 96, increases only slowly to the normal value of its operation. At time $t_3$, flip-flop 86 produces pulse 106, which sets analog capacitor 56 back to zero. Capacitor 56 is charged after the termination of pulse 106 by a voltage proportional to the increase of voltage 96. Thereby neither voltages 112 nor 114 is varied. Since voltage 116 has a very small negative value, rectangular voltage 92 is very slightly lengthened. As a result, a slowly changing current appears, flowing through transistor 36, which opposes the symmetrization of the transformer. However, since the lengthening of the pulse corresponds to an increase of input voltage, both signals are uniformly reduced in accordance with the decrease of the nominal value.

At time $t_4$, the conduction of transistor 36 is ended. Pulse 108 from flip-flop 88 sets analog capacitor 76 back to zero; i.e., voltage 144 is zero. Simultaneously, analog capacitor 70 is charged to the differential between voltages 98 and 100. This differential voltage corresponds to the normal operation without a saturated transformer, and the prevailing voltages on the apparent ohmic resistances of current inverters 42 and 44. Voltage 116 jumps to this value and shortens the duration of conduction of transistor 34, as controlled by pulse width modulator 28.

The conduction of transistor 34 begins at time $t_5$. Since the transformer at the time is not saturated, the current in transistor 34, and therewith voltage 94, increases rapidly to its prevailing value in normal operation. Flip-flop 82 again produces pulse 102, which discharges analog capacitor 54. After the end of pulse 102, however, analog capacitor 54 is immediately charged again to the value of voltage 94. The remaining voltages 100, 112, 114 and 116 retain their values trough time $t_5$.

At time $t_6$, rectangular voltage 92 drops back to zero. Then pulse 104 is produced by flip-flop 84. Through pulse 104, analog capacitor 70 is set back to zero; i.e., voltage 112 is zero. Analog capacitor 75 is charged to the differential between voltages 93 and 100. This differential can have the value zero, so that no disturbance variable signal is superimposed on the regulation fluctuation produced from subtraction circuit 22.

After time $t_6$, the circuit arrangement shown in FIG. 1 operates uninfluenced by disturbance variables. In other words, the pulse durations of rectangular signals 90 and 92 coincide with each other.

It is assumed that at time $t_7$, as a result of a disturbance such as variation of the input voltage, current begins to increase in the circuit containing primary winding half 14 and transistor 36. Thus, asymmetrical current flow occurs in both branches of the primary of the push-pull inverter. After time $t_7$, current comparison is made with the circuit containing primary winding half 14 and transistor 36, as has already been described with respect to the asymmetry of the circuit containing primary winding half 12 and transistor 34.

Switches 72 and 74, or 68 and 78, are rendered conductive by monostable flip-flops 84 and 88, causing only one of the differential voltages at outputs 64 and 66 to appear on amplifier 80. Therefore, the voltage on amplifier 80 also corresponds to the asymmetry of either the circuit containing primary winding half 12 and transistor 34, or to the circuit containing primary winding half 14 and transistor 36.

The control feedback (or disturbance) variable voltage 116 corresponds to the differential between the asymmetrical voltage 94 and the timed measured voltage 96. Then, on the basis of the positive or negative value of voltage 116, duration of the rectangular signal 90 is lengthened, if voltage 94 exceeds voltage 96. On the other hand, the duration of rectangular signal 90 is shortened if voltage 94 is less than voltage 96.

Thus, the detection of asymmetry and the application of the desired correction is achieved in only half a period of rectangular voltages 90 and 92.

In a simpler circuit construction, one of the branches with elements 68, 70 and 72 or 74, 76 and 78 may be deleted. This arrangement also maintains precise regulation of the output voltage with large disturbance fluctuations. However, in this case only the duration of rectangular voltage 92 or 90 is varied by pulse width modulator 28, if disturbances occur. When disturbance variable voltage 116 is produced as the differential between the asymmetrical signal 96 and the measured signal 94 timed thereby, voltage 92 immediately controls the rectangular signal duration. When there is a larger voltage 96 and smaller voltage 94, the rectangular signal duration is lengthened; with a smaller voltage 96 and larger voltage 94 the rectangular signal duration is shortened.

In this simpler circuit, an entire period of rectangular voltage 90 or 92 passes between the detection of asymmetry and the application of corrective measures.

It is particularly noted that the above measures rapidly achieve current regulation by alternately comparing the desired standard output value and the actual values as the differential between minuend and subtrahend, and by disturbance variable superimposition responsive to the differential signal.

I claim:

1. A method for maintaining precise regulation of the output of a push-pull inverter having primary winding means for generating said output, said primary winding means controlled by first and second alternately switched transistors, comprising the steps of:
   determining the voltage time areas of the transistor output signals in each of the transistor conduction periods;
   producing differential signals from the voltage time areas in consecutive transistor conduction periods;
   deriving a regulation fluctuation signal from the output generated by the primary winding means;
   superimposing the differential signals on the regulation fluctuation signal to produce transistor control signals; and,
   coupling the transistor control signals to the alternately switched transistors to vary the conduction periods in accordance with the differential signals, thereby reducing fluctuation of the output of the push-pull inverter and maintaining precise regulation.

2. A method according to claim 1, wherein the step of varying the conduction periods of the alternately switched transistors further comprises the steps of:
   lengthening the conduction period of the first transistor if the voltage time area of the second transistor output signal exceeds that of the first transistor output signal; and,
   shortening the conduction period of the first transistor if the voltage time area of the second transistor output signal is less than that of the first transistor output signal.

3. A method according to claim 1, wherein the step of producing differential signals from the voltage time areas comprises the step of producing a first differential signal and a second differential signal from consecutive transistor conduction periods, and further comprising the steps of:
   lengthening the conduction period of the second transistor if the voltage time area of the first transistor exceeds that of the second transistor, and shortening the conduction period of the second transistor if the voltage time area of the first transistor is less than that of the second transistor, said lengthening and shortening of the conduction period of the second transistor being responsive to the production of said first differential signal; and,
   lengthening the conduction period of the first transistor if the voltage time area of the second transistor exceeds that of the first transistor, and shortening the conduction period of the first transistor if the voltage time area of the second transistor is less than that of the first transistor, said lengthening and shortening of the conduction period of the first transistor being responsive to the production of said second differential signal.

4. A method for maintaining precise regulation of the output of a push-pull inverter having primary winding means for generating said output, said primary winding means controlled by first and second alternately switched transistors, comprising the steps of:
   producing voltages proportional to the currents flowing through the transistors in each of the transistor conduction periods;
   producing differential signals from the voltages in consecutive transistor conduction periods;
   deriving a regulation fluctuation signal from the output generated by the primary winding means;
   superimposing the differential signals on the regulation fluctuation signal to produce transistor control signals; and,
   coupling the transistor control signals to the alternately switched transistors to vary the transistor conduction periods in accordance with the differential signals, thereby reducing fluctuation of the output of the push-pull inverter and maintaining precise regulation.

5. A method according to claim 1 or claim 4, wherein the step of deriving a regulation fluctuation signal from the output generated by the primary winding means further comprises the steps of:
   producing a signal representative of the actual value of the output;
   comparing the signal representative of the actual value of the output to a predetermined value; and,
   producing a regulation fluctuation signal in accordance with the difference between the actual value of the output and the predetermined value.

6. A method according to claim 4, wherein the step of varying the conduction periods of the alternately switched transistors further comprises the steps of:
   lengthening the conduction period of the first transistor if the voltage proportional to the current flowing through the second transistor exceeds that of the first transistor; and
   shortening the conduction period of the first transistor if the voltage proportional to the current flowing through the second transistor is less than that of the first transistor.

7. A method according to claim 4, wherein the step of producing differential signals from the voltages proportional to the currents flowing through the transistors comprises the step of producing a first differential signal and a second differential signal from consecutive transistor conduction periods, and further comprising the steps of:
   lengthening the conduction period of the second transistor if the voltage proportional to the current flowing through the first transistor exceeds that of the second transistor, and shortening the conduction period of the second transistor if the voltage proportional to the current flowing through the first transistor is less than that of the second transistor, said lengthening and shortening of the conduction period of the second transistor being responsive to the production of said first differential signal; and, lengthening the conduction period of the first transistor if the voltage proportional to the current flowing through the second transistor exceeds that of the first transistor, and shortening the conduction period of the first transistor if the voltage proportional to the current flowing through the second transistor is less than that of the first transistor, said lengthening and shortening of the conduction period of the first transistor being responsive to the production of said second differential signal.

8. An apparatus for maintaining precise regulation of the output of a push-pull inverter having primary winding means for generating said output, and first and second alternately switched transistors for controlling the output of said primary winding means, comprising:

means for integrating the transistor output signals in each of the transistor conduction periods;

difference circuit means for producing differential signals from the integrated signals in consecutive transistor conduction periods;

means for deriving a regulation fluctuation signal from the output of the push-pull inverter;

summing circuit means for superimposing the differential signals on the regulation fluctuation signal; and, control means coupled to receive the summing circuit output signal, said control means coupled to said first and second transistors for varying the transistor conduction periods in accordance with the differential signals.

9. An apparatus for maintaining precise regulation of the output of a push-pull inverter having primary winding means for generating said output, and first and second alternately switched transistors for controlling the output of said primary winding means, comprising:

means for producing voltage signals proportional to the currents flowing through the transistors in each of the transistor conduction periods;

difference circuit means for producing differential signals from the voltage signals in consecutive transistor conduction periods;

means for deriving a regulation fluctuation signal from the output of the push-pull inverter;

summing circuit means for superimposing the differential signals on the regulation fluctuation signal; and, control means coupled to receive the summing circuit output signal, said control means coupled to said first and second transistors for varying the transistor conduction periods in accordance with the differential signals.

10. An apparatus according to claim 8 or claim 9, wherein said control means comprises pulse width modulator means having an input coupled to receive the summing circuit output signal, and having first and second outputs coupled to said first and second transistors, respectively.

11. An apparatus according to claim 8, wherein said primary winding means comprise first primary winding means coupled to said first transistor, and second primary winding means coupled to said second transistor, further comprising:

first peak detector means coupled between said integrating means and said difference circuit means, and having an output;

first switching means for setting the output of said first peak detector means to zero when said first transistor becomes conductive;

second peak detector means coupled between said integrating means and said difference circuit means, and having an output;

second switching means for setting the output of said second peak detector means to zero when said second transistor means becomes conductive;

said difference circuit means having a first output means for providing a first differential signal in accordance with the difference between the first peak detector output signal and the second peak detector output signal, and having a second output means for providing a second differential signal in accordance with the difference between the second peak detector output signal and the first peak detector output signal;

first charge storage means coupled to receive the first differential signal, and having an output;

third switching means for setting the output of said first charge storage means to zero when said first transistor becomes conductive;

second charge storage means coupled to receive the second differential signal, and having an output;

fourth switching means for setting the output of said second charge storage means to zero when said second transistor becomes conductive, whereby said third and fourth switching means alternately set the first and second differential signals to zero; and, means for coupling the alternately switched differential signals from said third and fourth switching means to said summing means.

12. An apparatus according to claim 8, wherein said primary winding means comprise first primary winding means coupled to said first transistor, and second primary winding means coupled to said second transistor, further comprising:

first peak detector means coupled between said integrating means and said difference circuit means, and having an output;

first switching means for setting the output of said first peak detector means to zero when said first transistor becomes conductive;

second peak detector means coupled between said integrating means and said difference circuit means, and having an output;

second switching means for setting the output of said second peak detector means to zero when said second transistor becomes conductive;

third switching means for selectively switching the differential signals when said first transistor becomes conductive;

charge storage means coupled to said third switching means, and having an output;

fourth switching means for setting the output of said charge storage means to zero when said first transistor becomes conductive;

means for coupling the alternately switched differential signals from said fourth switching means to said summing means; and, flip-flop means coupled between said control means and said third and fourth switching means for selectively controlling said third and fourth switching means.

13. An apparatus according to claim 9, wherein said primary winding means comprise first primary winding means coupled to said first transistor, and second primary winding means coupled to said second transistor, further comprising:
- first peak detector means coupled between said means for producing voltage signals and said difference circuit means, and having an output;
- first switching means for setting the output of said first peak detector means to zero when said first transistor becomes conductive;
- second peak detector means coupled between said means for producing voltage signals and said difference circuit means, and having an output;
- second switching means for setting the output of said second peak detector means to zero when said second transistor means becomes conductive;
- said difference circuit means having a first output means for providing a first differential signal in accordance with the difference between the first peak detector output signal and the second peak detector output signal, and having a second output means for providing a second differential signal in accordance with the difference between the second peak detector output signal and the first peak detector output signal;
- first charge storage means coupled to receive the first differential signal, and having an output;
- third switching means for setting the output of said first charge storage means to zero when said first transistor becomes conductive;
- second charge storage means coupled to receive the second differential signal, and having an output;
- fourth switching means for setting the output of said second charge storage means to zero when said second transistor becomes conductive, whereby said third and fourth switching means alternately set the first and second differential signals to zero; and,
- means for coupling the alternately switched differential signals from said third and fourth switching means to said summing means.

14. An apparatus according to claim 9, wherein said primary winding means comprise first primary winding means coupled to said first transistor, and second primary winding means coupled to said second transistor, further comprising:
- first peak detector means coupled between said means for producing voltage signals and said difference circuit means, and having an output;
- first switching means for setting the output of said first peak detector means to zero when said first transistor becomes conductive;
- second peak detector means coupled between said means for producing voltage signals and said difference circuit means, and having an output;
- second switching means for setting the output of said second peak detector means to zero when said second transistor means becomes conductive;
- third switching means coupled to receive the differential signals for alternately providing the differential signals when said first transistor becomes conductive;
- charge storage means coupled to said third switching means, and having an output;
- fourth switching means for setting the output of said charge storage means to zero when said first transistor becomes conductive;
- means for coupling the alternately switched differential signals from said fourth switching means to said summing means; and,
- flip-flop means coupled between said control means and said third and fourth switching means for selectively controlling said third and fourth switching means.

15. An apparatus according to claim 11 or claim 13, wherein said control means comprises pulse width modulator means having an input coupled to receive the summing circuit output signal, and having first and second outputs coupled to said first and second transistors, respectively.

16. An apparatus according to claim 15, further comprising flip-flop means coupled between said pulse width modulator means and said third and fourth switching means for selectively controlling said third and fourth switching means.

17. An apparatus according to claim 12 or claim 14, wherein said control means comprises pulse width modulator means having an input coupled to receive the summing circuit output signal, and having first and second outputs coupled to said first and second transistors, respectively.

18. An apparatus according to any of claims 9, 13 or 14 wherein said means for producing voltage signals proportional to the currents flowing through the transistors in each of the transistor conduction periods comprises current inverter means.

* * * * *